(12) United States Patent  (10) Patent No.: US 9,405,061 B2
Westbrook                      (45) Date of Patent: Aug. 2, 2016

(54) AVOIDING BEAM OBSTRUCTION DURING INSCRIPTION OF FIBER GRATINGS

(71) Applicant: OFS FITEL, LLC, Norcross, GA (US)

(72) Inventor: Paul S Westbrook, Bridgewater, NJ (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/419,099

(22) PCT Filed: Aug. 6, 2013

(86) PCT No.: PCT/US2013/053720
§ 371 (c)(1),
(2) Date: Feb. 2, 2015

(87) PCT Pub. No.: WO2014/025732
PCT Pub. Date: Feb. 13, 2014

(65) Prior Publication Data
US 2015/0219843 A1   Aug. 6, 2015

Related U.S. Application Data

(60) Provisional application No. 61/680,855, filed on Aug. 8, 2012.

(51) Int. Cl.
*G02B 6/34* (2006.01)
*G02B 6/02* (2006.01)

(52) U.S. Cl.
CPC ........ *G02B 6/02128* (2013.01); *G02B 6/02042* (2013.01); *G02B 6/02142* (2013.01); *G02B 6/02152* (2013.01); *G02B 6/34* (2013.01); *G02B 2006/02161* (2013.01)

(58) Field of Classification Search
CPC ........... G02B 6/02128; G02B 6/02042; G02B 6/02142; G02B 6/02152; G02B 6/34; G02B 2006/02161
USPC ................................................ 385/12–13, 37
See application file for complete search history.

(56) References Cited

U.S. PATENT DOCUMENTS

| 5,502,786 | A | * | 3/1996 | Inniss | B82Y 15/00 385/11 |
|---|---|---|---|---|---|
| 5,912,999 | A | * | 6/1999 | Brennan, III | G02B 6/29317 359/569 |
| 6,035,083 | A | * | 3/2000 | Brennan, III | G02B 6/02138 359/569 |
| 6,404,956 | B1 | * | 6/2002 | Brennan, III | G02B 6/02138 372/102 |
| 6,459,834 | B1 | * | 10/2002 | Kim | G02B 6/02142 385/11 |
| 6,483,965 | B1 | * | 11/2002 | Napier | G02B 6/02138 359/566 |
| 7,324,714 | B1 | * | 1/2008 | Cranch | G01B 11/18 250/227.16 |
| 7,587,110 | B2 | * | 9/2009 | Singh | G02B 6/02042 385/126 |
| 8,746,076 | B2 | * | 6/2014 | Rogge | G01L 1/24 385/12 |
| 8,989,528 | B2 | * | 3/2015 | Udd | A61B 5/06 385/10 |
| 2006/0215976 | A1 | * | 9/2006 | Singh | G02B 6/02042 385/126 |
| 2011/0052129 | A1 | * | 3/2011 | Sasaoka | G02B 6/02042 385/126 |
| 2012/0195563 | A1 | * | 8/2012 | Takenaga | G02B 6/02042 385/126 |
| 2014/0312014 | A1 | * | 10/2014 | Westbrook | G02B 6/02133 219/121.69 |
| 2015/0029511 | A1 | * | 1/2015 | 'T Hooft | G01B 11/16 356/477 |

* cited by examiner

*Primary Examiner* — Ryan Lepisto
*Assistant Examiner* — Guy Anderson
(74) *Attorney, Agent, or Firm* — Sam Han, Esq.

(57) ABSTRACT

The present disclosure provides systems and methods for avoiding beam obstructions during inscription of fiber gratings. For some embodiments, an optical fiber is re-oriented during fiber inscription to avoid obstruction of the actinic beam.

14 Claims, 7 Drawing Sheets

AVOIDING BEAM OBSTRUCTION DURING INSCRIPTION OF FIBER GRATINGS

CROSS REFERENCE TO RELATED APPLICATIONS

This application claims the benefit of U.S. provisional patent application Ser. No. 61/680,855, filed 2012 Aug. 8, having the title "Mitigation of Writing Beam Obstruction Through Fiber Twist," which is incorporated herein by reference in its entirety.

BACKGROUND

1. Field of the Disclosure

The present disclosure relates generally to optical fibers and, more particularly, to fiber gratings.

2. Description of Related Art

Typically, proper inscription of gratings onto optical fibers requires exposure of fiber cores to actinic radiation. However, problems can arise when there are obstructions between the source and the target of the actinic radiation. Consequently, there are ongoing efforts to improve the fiber-inscription process.

SUMMARY

The present disclosure provides systems and methods for avoiding beam obstructions during inscription of fiber gratings. For some embodiments, an optical fiber is re-oriented during fiber inscription to avoid obstruction of the actinic beam. Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Gratings in optical fibers are typically inscribed using actinic radiation (e.g., ultraviolet radiation, etc.), which is either focused to a particular point or passed through an interferogram to create a desired interference pattern for inscription. The actinic radiation is transmitted from the outside of the fiber to the inside of the fiber where one or more cores are located. The radiation that reaches the core inscribes the core with the grating pattern.

Sometimes, obstructions (e.g., defects in fiber coating, air lines in fiber cladding resulting from bubbles in a fiber preform, air microstructures, stress rods, other cores in multicore fibers, etc.) exist in the pathway of the actinic radiation, which cause scattering, distortion, absorption, or blockage of the actinic radiation. Consequently, the obstructions hinder inscription of the gratings, which in turn can result in poor performance of the inscribed optical fiber.

Although an optical fiber can be rotated about its longitudinal axis to irradiate a certain portion of the optical fiber, that orientation is typically fixed during exposure. While these types of fixed-orientation exposures can avoid fixed obstructions that do not vary rotationally along a length of a fiber (e.g., stress rods in polarization-maintaining fibers), the fixed-orientation exposures cannot properly accommodate obstructions that vary rotationally along the length of the fiber. For example, in multicore fibers in which the fiber is twisted such that the cores follow a spiral path along the length of the fiber, one core may become an obstruction to another core. Specifically, when a grating length is longer than the length of the period of a twist, then at some point in the length of the fiber one core will necessarily impede irradiation of another core. Conventional inscription methods do not adequately address these obstructions.

The disclosed systems and methods provide approaches to mitigating obstructions by changing a rotational orientation of a fiber during inscription, thereby changing the irradiated location on the fiber with reference to the source of the actinic radiation. Consequently, each irradiation point along the length of the optical fiber is exposed at least once without obstruction. This results in properly inscribed gratings that do not suffer from defects that are caused by obstructions.

Having provided an overview of the systems and methods for avoiding beam obstruction, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Figure 1:
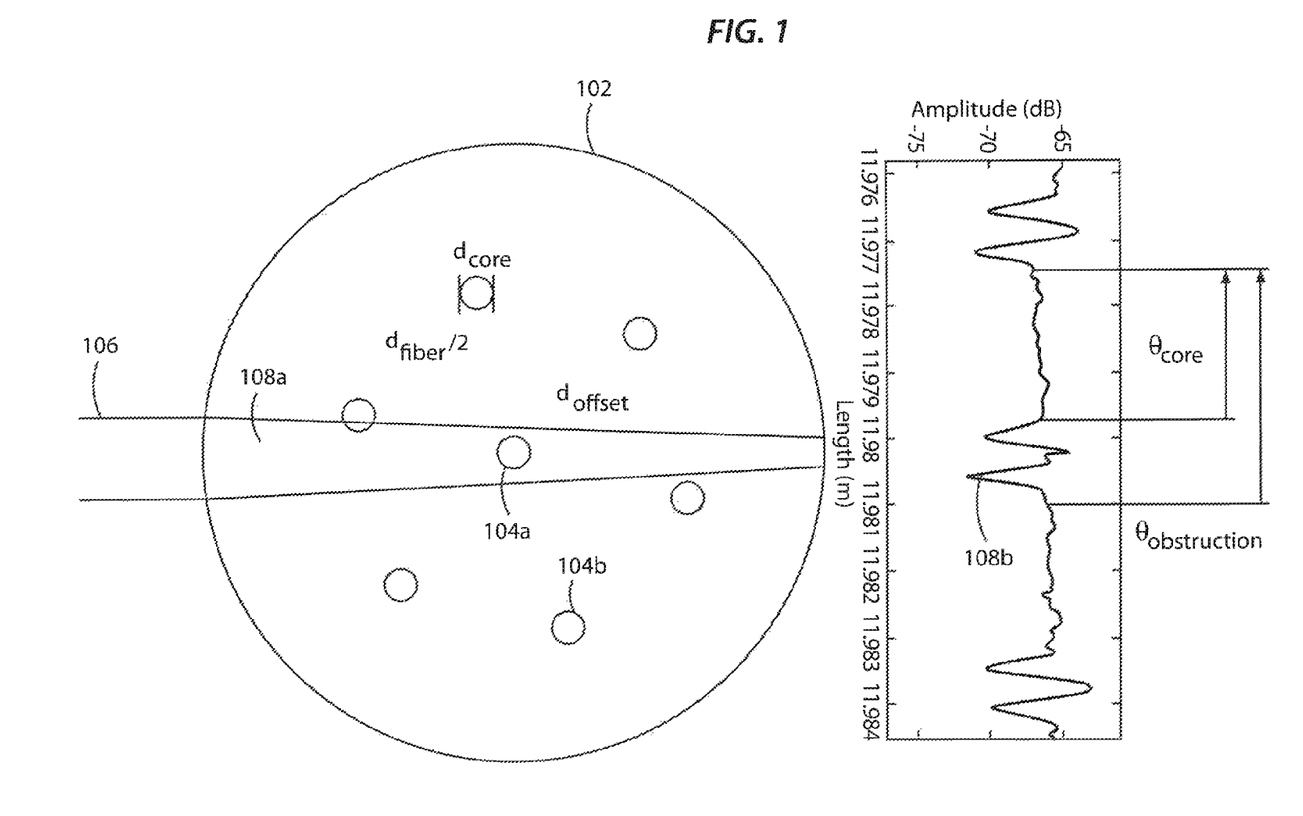
FIG. 1 is a diagram showing one embodiment of a cross-section of a multicore optical fiber.

FIG. 1 is a diagram showing one embodiment of a cross-section of a multicore optical fiber 102 having a fiber diameter of $d_{fiber}$. In the specific embodiment of FIG. 1, the optical fiber 102 has a center core 104a and six (6) outer cores 104b that are located at an offset distance of $d_{offset}$ from the center core 104a. Each of the cores 104a, 104b (collectively 104) has a core diameter of $d_{core}$. If the fiber 102 is a twisted multicore fiber, then the outer cores 104b exhibit a spiral behavior along the length of the multicore fiber 102. Consequently, the cross-sectional location of the outer cores 104b changes rotationally (as shown by the arrow) as one traverses the length of the fiber 102. Thus, when the fiber 102 is irradiated 106, one of the outer cores 104b will inevitably enter the pathway of the actinic radiation 106 at some point along the length of the fiber 102. For convenience, this region is designated as an obstruction zone 108a. The position along the length of the fiber 102 where this occurs will exhibit a defect 108b that corresponds to the obstruction.

The following specific optical fiber characteristics are used to more clearly illustrate the problem: (a) a multicore fiber; (b) with seven total cores; (c) a twist rate of approximately 50 twists per meter, which results in a twist period of approximately 20 mm; (d) a fiber diameter of 125 μm; (e) an offset of the outer cores being 36.4 μm; (f) a core diameter of 6.58 μm. When the rotational axis of a fiber 102 with these characteristics is fixed during inscription, the grating in the center core 104a will exhibit a series of defects that result from obstruction of the actinic radiation by the outer cores 104b. These defects are shown in FIG. 2, which is a graph showing grating strength as a function of length in this specific embodiment of a multicore optical fiber 102.

Figure 2:
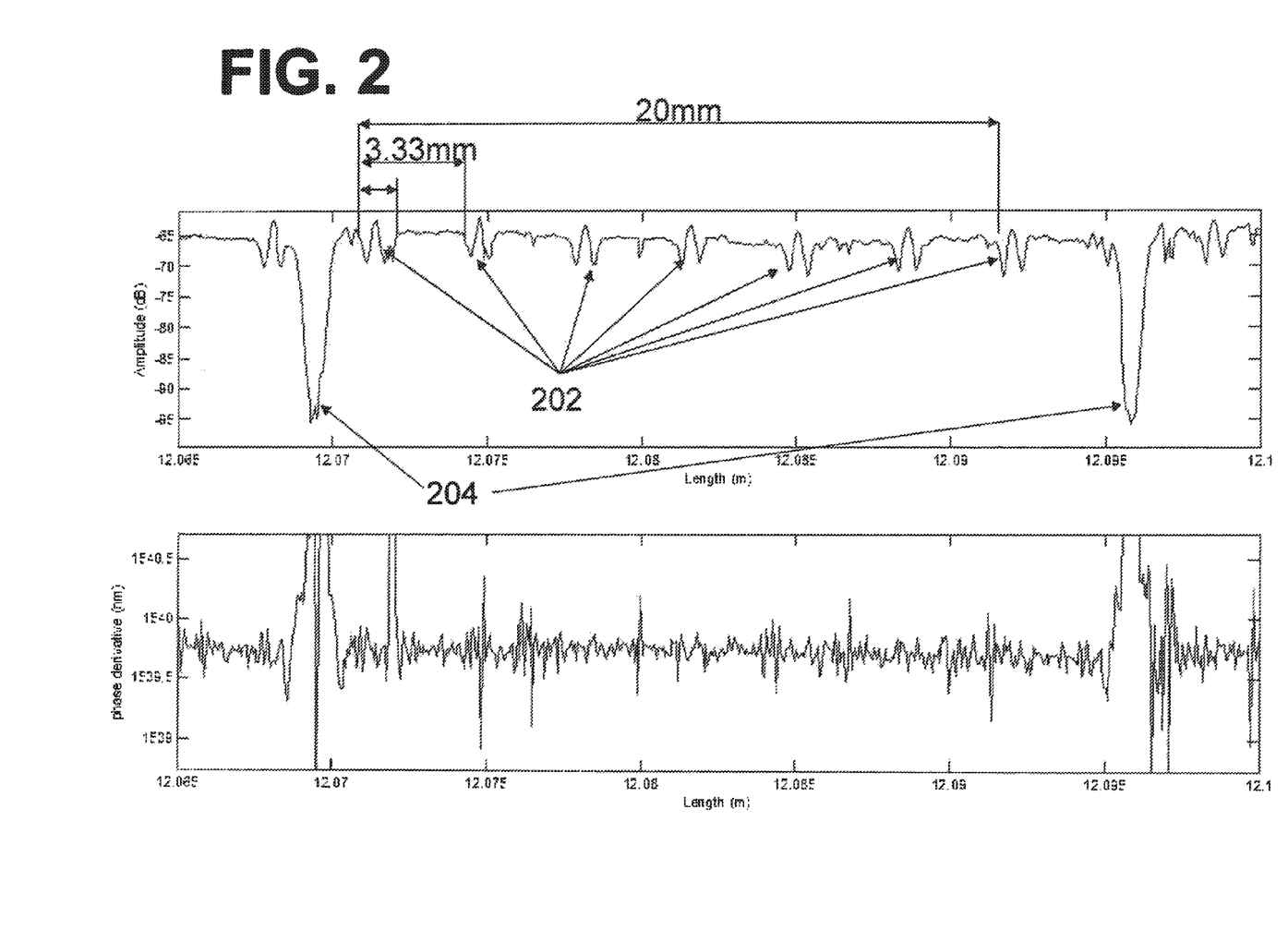
FIG. 2 is a graph showing grating strength as a function of length in one embodiment of an optical fiber with multiple cores.

As seen from FIG. 2, the grating boundaries 204 span from approximately 1206.8 cm through approximately 1209.6 cm (approximately 28 mm interferogram). During a length of approximately 20 mm (from approximately 1207 cm through 1209 cm), which represents one full twist period, FIG. 2 shows six (6) areas of defect 202. Each of these defective areas 202 represents an obstruction by one of the six (6) outer cores 104b (FIG. 1) and occurs at approximately 3.33 mm intervals. Also, the core offset of 36.4 μm and diameter of 6.58 μm translate to an obstruction length of approximately 1.1 mm. Stated differently, since there are six (6) obstructions (one for each of the outer cores 104b), and the obstructions occur at 3.33 mm intervals, each 3.33 mm interval translates to a 60 degree rotation. Also, since the obstruction length is approximately 1.1 mm, this translates to the obstruction being present for approximately 20 degrees of fiber rotation.

If the twist period, the obstruction length, the number of obstructions, and the regularity (or frequency) of the obstruction is known, then it becomes possible to compute an appropriate number of exposures and an appropriate separation of the exposures. Thus, recalling the example above, an obstruction occurs at every 60 degrees, with each obstruction occurring for 20 degrees. Consequently, if at least one unobstructed exposure is desired, then the exposures must have a separation that is between 20 degrees and 40 degrees. By way of explanation, a rotation that is less than 20 degrees will be insufficient for any exposure that starts with a partial obstruction by an outer core 104b because the outer core 104b requires at least a 20 degree rotation to completely move beyond any obstruction zone 108a (FIG. 1). Similarly, a rotation that is greater than 40 degrees will always bring an outer core 104b into the obstruction zone 108a (FIG. 1).

Also, should a larger rotation be desired, the rotation angle can be adjusted to be 30+60N±10 degrees, where N is an integer. One advantage of using a larger rotation is that it guarantees exposure of the outer cores 104b if at least two exposures are separated by 180 degrees. As shown in FIG. 1, in the absence of surface defects or other non-core-related obstructions, the outer cores 104b, which are located on the side of the fiber 102 where the actinic radiation enters, are exposed without obstruction. Thus, half of the outer cores 104b is exposed without obstruction during the first exposure, and the other half of the outer cores 104b are exposed without obstruction during the exposure that is 180 degrees from the first exposure. Therefore, for this fiber, if every part of the fiber is exposed at least three times with the fiber rotated by 0, 30, and 180 degrees, then all cores will experience at least one exposure at every point along the fiber that is not obstructed by another core. Many other sets of angles are also possible.

It should be appreciated by those having skill in the art that these numbers are appropriate for irradiating the center core 104a of the fiber 102, when six (6) outer cores 104b are equally-spaced about the center core 104a. For other configurations, one can readily calculate the appropriate exposure angles.

Figure 3:
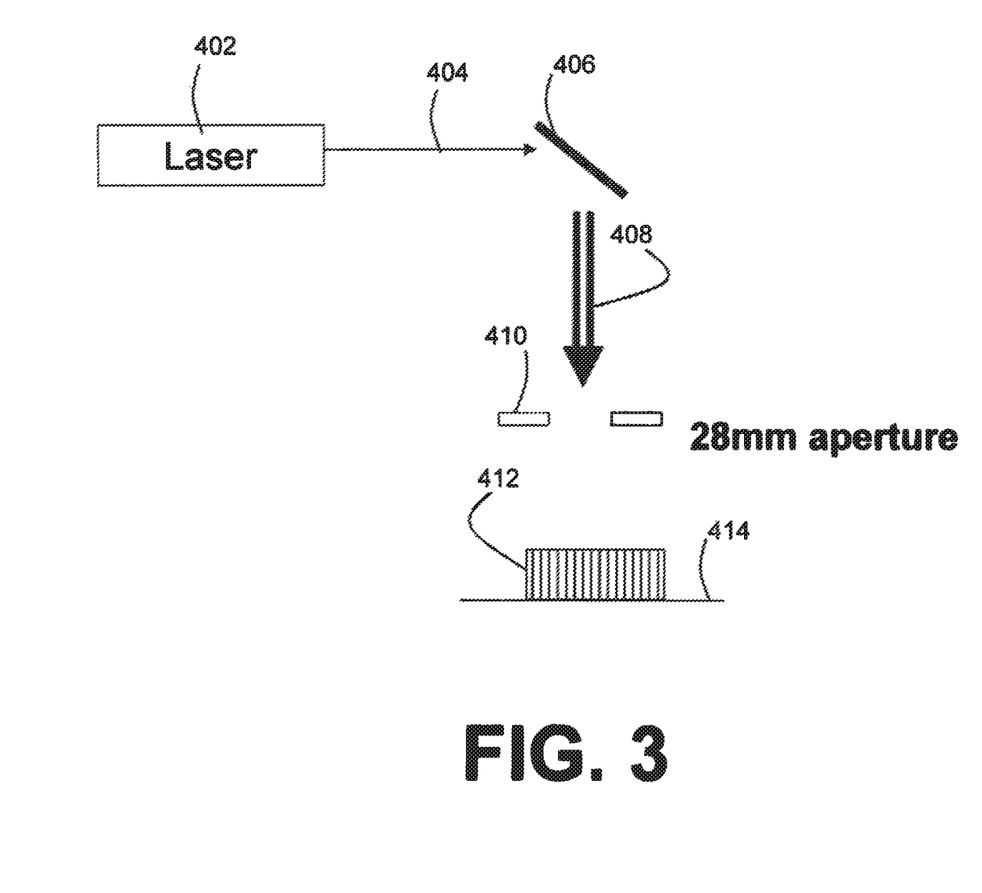
FIG. 3 is a diagram showing one embodiment of a system for writing gratings.

The above configuration was fabricated and tested to determine the efficacy of the disclosed systems and processes. FIG. 3 is a diagram showing one embodiment of a system for writing gratings. As shown in FIG. 3, this particular embodiment of the system comprises a laser 402 that is triggered at every 4 mm to write gratings on an optical fiber 414 with seven cores (one center core, six outer cores) and fifty twists per meter. The beam 404 is reflected to form writing laser beam 408. The writing laser beam 408 passes through a 28 mm aperture 410 and through a chirped phase mask 412 that forms a 28 mm interferogram. For this particular embodiment, the fiber 414 is twisted by approximately 10 degrees/cm between exposures, translated approximately 4 mm between exposures, and exposed seven (7) times. Given the configuration of the fiber 414, the fiber twists at approximately 1 degree/mm during each translation.

With this type of setup, the total rotation of the fiber 414 over all seven (7) exposures is estimated to be approximately 24 degrees, which is sufficient to produce at least one unobstructed exposure at each point in the center core. The experimental setup of FIG. 4 is verified using optical back-scattering reflectometry (OBR, LUNA technologies) to obtain a grating spectrum from 1 mm sections of the grating.

Figure 4:
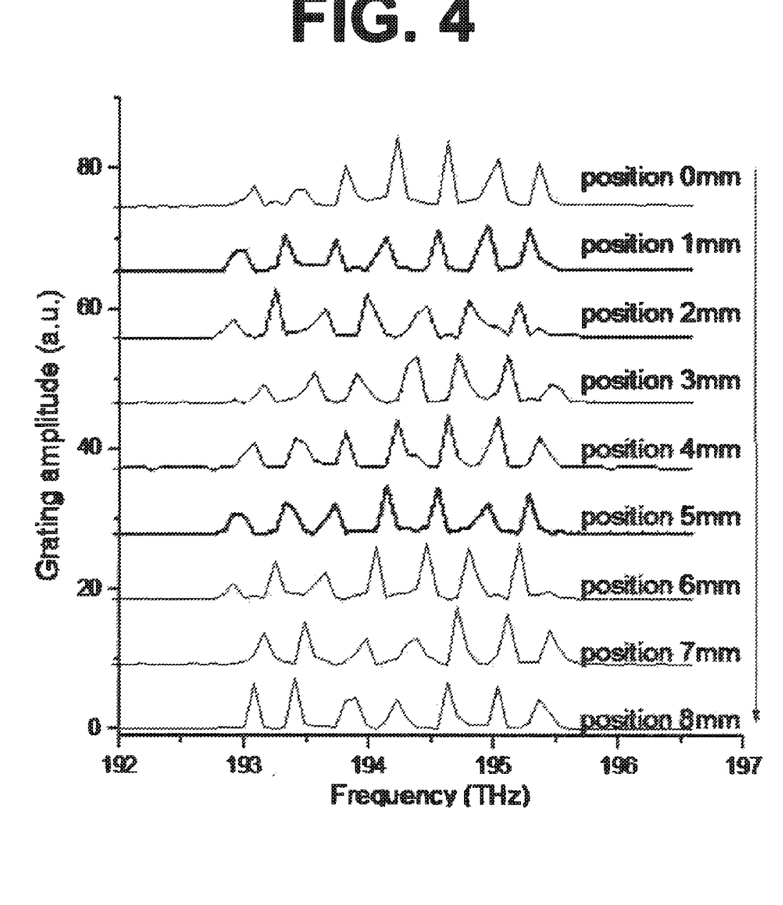
FIG. 4 is a graph showing a grating spectrum obtained by optical back-scattering reflectometry for one embodiment of an optical fiber with multiple cores.

FIG. 4 is a graph showing a grating spectrum obtained by OBR for the above-described embodiment of the fiber 414 (FIG. 3). As shown in FIG. 4, there are seven (7) spectral peaks, each corresponding to one of the seven exposures. While not all of the peaks have the same height, thereby evidencing obstructions in some exposures, there exists at least one unobstructed peak at each 1 mm segment, thereby evidencing at least one unobstructed exposure for each segment. Various graphs showing results of this process are shown in FIGS. 5A through 7B. Note that these plots are obtained using an 88 nm scan range to obtain the raw spectral information and an integration width of 1 mm to obtain the local spectrum shown in FIG. 4. Thus each spectrum is extracted from 1 mm of length measured along the core. This 1 mm length then defines the properties of the fiber at the position in question. It should be appreciated that different integration widths are also possible. Thus, it should be understood that this disclosure is not limited to the specific embodiment described with reference to the 1 mm integration width.

Figures 5A, 5B:
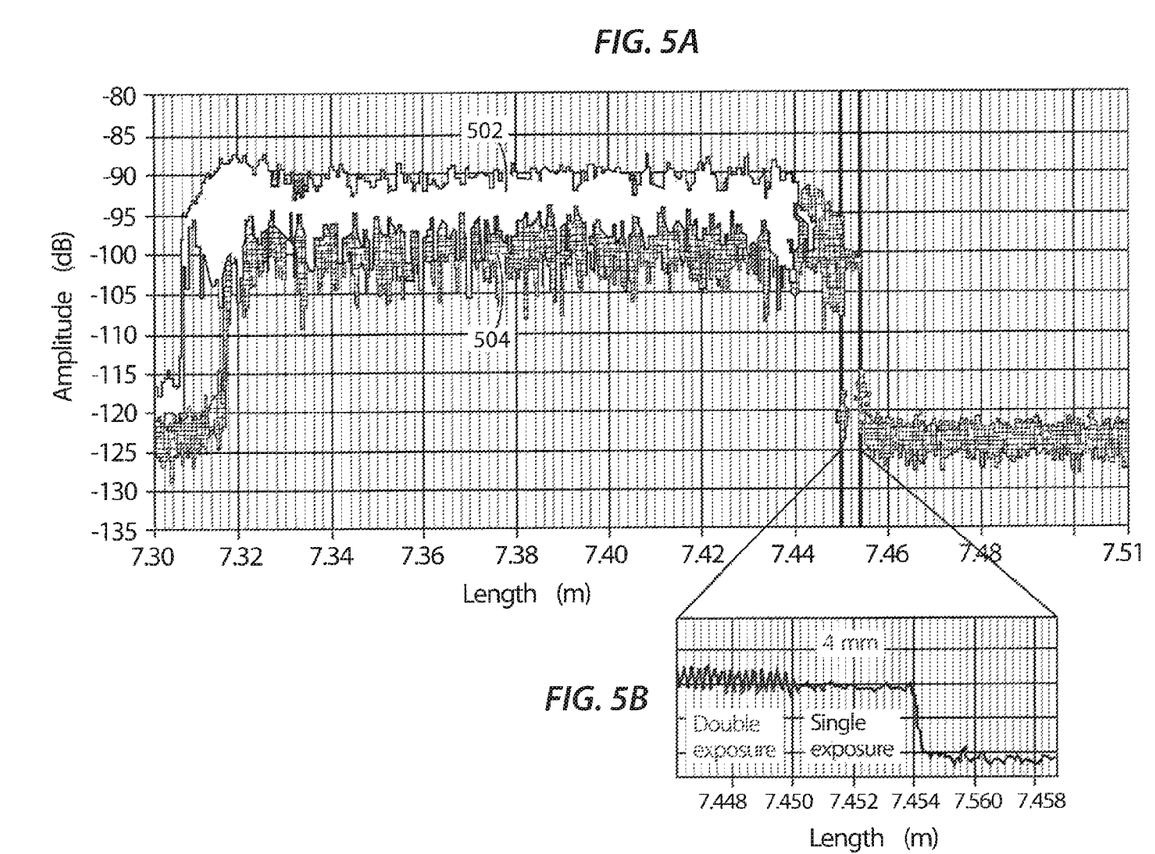
FIGS. 5A and 5B are graphs showing one example of grating strength as a function of position for two cores, in accordance with one embodiment of the invention.
Figure 6A:
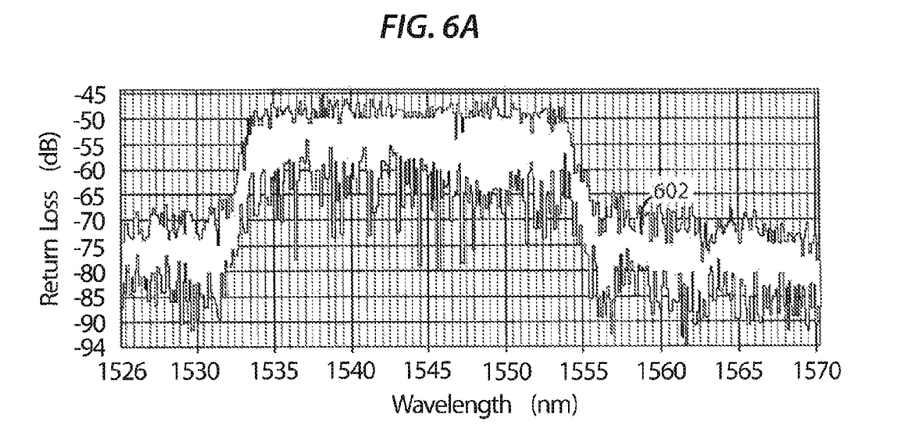
FIGS. 6A and 6B are graphs showing one example of a spectrum of one embodiment of an entire grating.
Figure 6B:
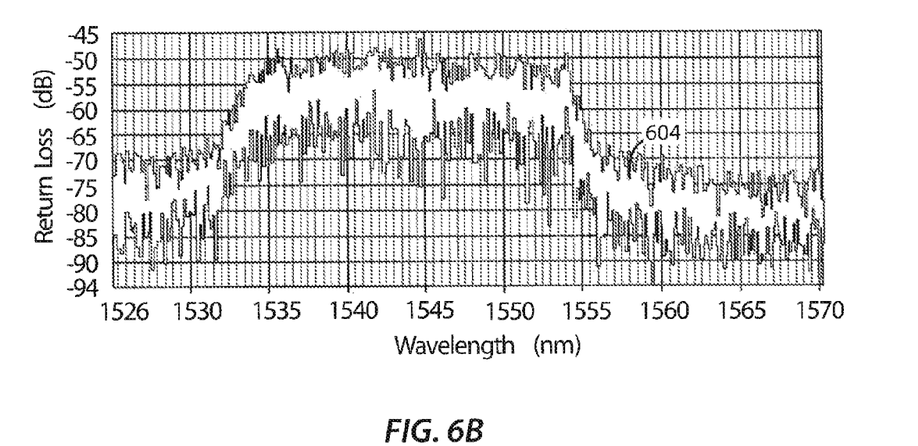
Figure 7A:
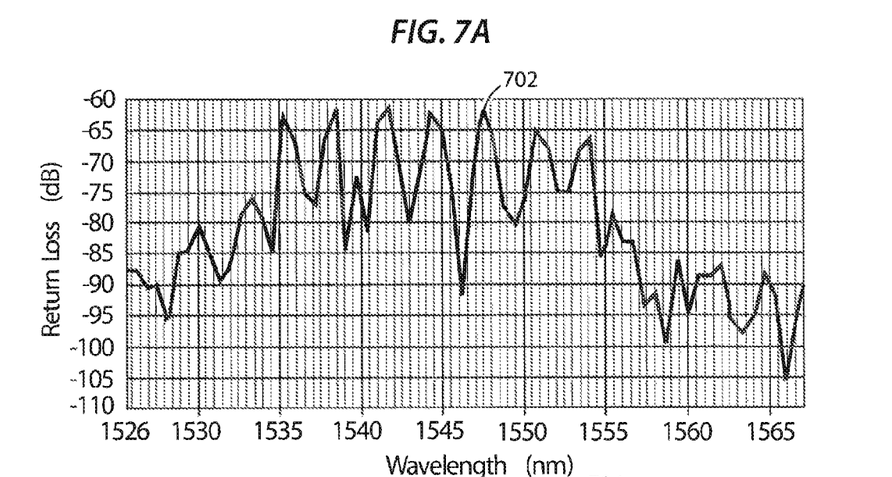
FIGS. 7A and 7B are graphs showing a spectrum from one embodiment of a single 1 mm length of fiber.
Figure 7B:
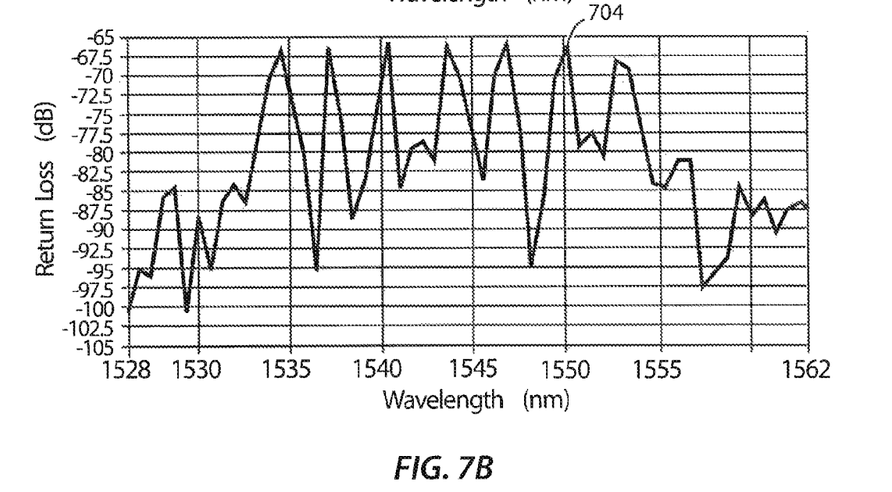

Specifically, FIGS. 5A and 5B are graphs showing one example of grating strength as a function of position for two cores, in accordance with one embodiment of the invention. The graph of FIG. 5A shows an amplitude spectrum of the grating strength for a center core 502 and an outer core 504. FIG. 5B, which is an expansion of a small section of FIG. 5A, shows the difference in grating strength between a single exposure and a double exposure. As shown in FIG. 5B, the double-exposure section shows stronger gratings, as compared to the 4 mm single-exposure section. FIGS. 6A and 6B are graphs showing one example of a spectrum of one embodiment of an entire grating, while FIGS. 7A and 7B are graphs showing a spectrum from one embodiment of a single 1 mm length of fiber. As shown in FIGS. 7A and 7B, peaks due to seven wavelengths are observed in the 1 mm section of the fiber.

These results show that beam obstruction is mitigated by strategically rotating or twisting a fiber during exposure. Thus, calculated rotation of the fiber as it translates across the interferogram results in at least one unobstructed exposure, thereby improving the integrity of the inscribed gratings.

Although exemplary embodiments have been shown and described, it will be clear to those of ordinary skill in the art that a number of changes, modifications, or alterations to the disclosure as described may be made. For example, it should be appreciated that the fiber may be rotated or twisted in any number of ways, depending on the particular configuration of the fiber, the location of a possible obstruction, and the desired length of the grating. In some embodiments, the fiber can be mounted end to end, possibly using a reel to reel apparatus that permits twisting or rotation of the fiber. For other embodiments, the fiber may be secured with a pair of clamps that permit twisting or rotation of the fiber. The writing beam may also be rotated with respect to the fiber to change the orientation angle of the writing beam with respect to the cores.

Yet other embodiments include a method for writing gratings on a fiber with at least one obstruction, where the fiber is twisted or rotated during or between multiple successive exposures to actinic radiation. For some embodiments, where the fiber is a multicore fiber, the obstruction could be one of the cores. For other embodiments, the obstruction could be some other type of physical perturbation or defect. By way of example, one embodiment of the process comprises mounting a multicore fiber end to end (possibly using a reel to reel apparatus or a pair of clamps), inscribing a grating onto at least one core of the fiber using successive exposures to actinic radiation, and twisting the fiber either during or in between exposures to irradiate each of the cores, at least once, without obstruction. A further aspect includes exposing all of the cores to radiation at least once without obstruction.

For still other embodiments, multicore fibers are inscribed with continuous gratings using several successive exposures such that each part of the fiber is exposed N times. Between exposures, the fiber is translated and rotated about its axis by a prescribed amount. Preferably, the rotation is large enough that each core will be exposed at least once without obstruction by the other cores or any other obstruction in the fiber or its coating. By way of example, one embodiment comprises a process in which a first location of an optical fiber core is exposed to actinic radiation to inscribe that location with a grating of a fixed length. Thereafter, the optical fiber is axially moved by an incremental distance, which is less than the length of the grating, and rotated by a predefined angle. The optical fiber core is then exposed again. Note that, equivalently, the writing beam may be rotated and the fiber held fixed. Such a writing process can inscribe a grating in the fiber of FIG. 1 that exhibits no obstructions of any core by any other core at any point along the fiber.

Other embodiments use a camera to form an image of the optical path that is irradiated by the actinic beam. If an obstruction is observed, the fiber is twisted or rotated about its axis until the obstruction is removed, and thereafter the fiber is irradiated without obstruction. In general, a rotation of plus or minus 90 degrees is sufficient to move any obstruction from the beam path. To prevent excessive twisting in the fiber, the fiber may be untwisted once the fiber has been exposed. It should be appreciated that any twisting or rotation may be performed before, during, or after translation of the fiber. In a reel to reel system, rotations about the fiber axis may be applied to the fiber by rotating or displacing the pulleys used to guide the fiber through the system, and then translating the fiber through the displaced or rotated fiber pulleys.

These embodiments depict a continuous twisted multicore fiber grating in which a grating is formed at each point in each core by more than one exposure, and in which at least one of the exposures occurs without obstruction. To the extent that the twist period of the cores is known, the fiber may also be untwisted to remove the obstruction, or, alternatively, a non-uniform twist may be applied to the fiber to remove the obstruction from the beam path. Exposure of the untwisted fiber and proper orientation could then yield gratings in all cores that exhibit no obstructions from any other cores.

In another embodiment, the fiber is twisted and oriented before or during exposure. For example, the fiber may be rotated about its axis by one angle at one point and by another angle at another point (using for instance a pair of fiber clamps attached to rotary mounts). In any of the above embodiments, a change in fiber orientation may correspond to either a rotation about the fiber axis, or a twist about the fiber axis, or a twist and a rotation about the fiber axis. By way of example, one embodiment of the process comprises the steps of determining a location of an obstruction on an optical fiber, rotating the optical fiber to mitigate for the obstruction, and exposing the optical fiber with the actinic radiation.

Other embodiments include a gratings-inscribed, twisted, multicore fiber in which no grating exhibits defects that are caused by obstruction of the actinic beam.

Other embodiments include a gratings-inscribed, twisted, multicore fiber in which at every point in every core, there is at least on unobstructed exposure. For this embodiment, the optical fiber comprises a center core, helical outer cores disposed about the center core (with each helical outer core having a pitch), and gratings inscribed along a finite length of the center core, where the finite length is greater than the pitch, and the gratings are exposed at least once without obstruction.

As used throughout this disclosure, an obstruction should be understood to be anything that hinders the inscription of gratings. In other words, an obstruction should be understood to mean anything that scatters, distorts, attenuates, blocks, absorbs, etc., the actinic radiation.

All such changes, modifications, and alterations should therefore be seen as within the scope of the disclosure.

What is claimed is:

1. In an optical fiber having obstructions in which an obstruction length, a number of obstructions, and a regularity of the obstructions is known, a method comprising:
    exposing a first location of a core of an optical fiber to incoming actinic radiation, the incoming actinic radiation to inscribe the first location with a grating, the inscribed grating having a finite length;
    axially moving the optical fiber an incremental distance, the incremental distance being less than the finite length;
    changing a rotational orientation of the optical fiber with reference to a source of the incoming actinic radiation by a predefined angle of rotation, the predefined angle being a function of the obstruction length, the number of obstructions, and the regularity of the obstructions; and
    exposing a second location of the core with the incoming actinic radiation.

2. The method of claim 1, the step of changing the rotational orientation comprising the step of rotating the optical fiber.

3. The method of claim 1, the step of changing the rotational orientation comprising the step of moving the incoming actinic radiation source.

4. The method of claim 1, the step of changing the rotational orientation comprising the step of twisting the optical fiber.

5. The method of claim 1, further comprising holding the optical fiber on a reel-to-reel system.

6. The method of claim 1, further comprising holding the optical fiber with clamps.

7. In an optical fiber having obstructions in which an obstruction length, a number of obstructions, and a regularity of the obstructions is known, a method comprising:
   determining a location of an obstruction;
   changing a rotational orientation of the optical fiber with reference to an actinic radiation source to mitigate for the obstruction, the rotational orientation being a function of the obstruction length, the number of obstructions, and the regularity of the obstructions; and
   exposing the optical fiber with incoming actinic radiation.

8. The method of claim 7, the step of changing the rotational orientation comprising the step of rotating the optical fiber.

9. The method of claim 7, the step of changing the rotational orientation comprising the step of moving the actinic radiation source.

10. The method of claim 7, the step of changing the rotational orientation comprising the step of twisting the optical fiber.

11. The method of claim 7, further comprising holding the optical fiber on a reel-to-reel system.

12. The method of claim 7, further comprising holding the optical fiber with clamps.

13. A product made by the method of claim 1.

14. A product made by the method of claim 7.

* * * * *